(12) United States Patent
Fukasaku et al.

(10) Patent No.: US 9,188,115 B2
(45) Date of Patent: Nov. 17, 2015

(54) ELECTRIC MOTOR FOR A MOTOR-DRIVEN COMPRESSOR AND SAID MOTOR-DRIVEN COMPRESSOR

(75) Inventors: Hiroshi Fukasaku, Kariya (JP); Taku Adaniya, Kariya (JP)

(73) Assignee: KABUSHIKI KAISHA TOYOTA JIDOSHOKKI, Aichi-Ken (JP)

(*) Notice: Subject to any disclaimer, the term of this patent is extended or adjusted under 35 U.S.C. 154(b) by 484 days.

(21) Appl. No.: 13/608,339

(22) Filed: Sep. 10, 2012

(65) Prior Publication Data

US 2013/0078123 A1 Mar. 28, 2013

(30) Foreign Application Priority Data

Sep. 28, 2011 (JP) ................................. 2011-211996

(51) Int. Cl.
*H02K 1/27* (2006.01)
*F04B 35/04* (2006.01)
*H02K 7/04* (2006.01)

(52) U.S. Cl.
CPC ................ *F04B 35/04* (2013.01); *H02K 1/278* (2013.01); *H02K 1/2733* (2013.01); *H02K 7/04* (2013.01); *H02K 2201/06* (2013.01)

(58) Field of Classification Search
CPC ....................................................... H02K 7/04
USPC ............... 310/156.43, 156.47, 156.12, 261.1; 417/410.1, 432.7, 423.1, 424.1, 42.7, 417/424.13
See application file for complete search history.

(56) References Cited

U.S. PATENT DOCUMENTS

| 6,242,826 | B1 | 6/2001 | Saito et al. |
|---|---|---|---|
| 6,351,043 | B1 * | 2/2002 | Wolf et al. ...................... 310/51 |
| 7,040,871 | B2 * | 5/2006 | Ueda et al. .................... 417/223 |
| 7,462,968 | B2 * | 12/2008 | Kusase et al. ............... 310/75 R |
| 7,768,166 | B2 * | 8/2010 | Lafontaine et al. ............. 310/90 |
| 8,074,344 | B2 * | 12/2011 | Hanaoka et al. ................ 29/598 |
| 8,109,742 | B2 * | 2/2012 | Tabata et al. ............. 417/423.1 |
| 2002/0180294 | A1 * | 12/2002 | Kaneda et al. ........... 310/156.43 |
| 2005/0231057 | A1 | 10/2005 | Kloepzig et al. |
| 2006/0055266 | A1 * | 3/2006 | Iwami et al. ............. 310/156.47 |
| 2007/0035192 | A1 * | 2/2007 | Jeon et al. ................ 310/156.38 |
| 2009/0001825 | A1 | 1/2009 | Hanaoka et al. |
| 2009/0224621 | A1 | 9/2009 | Okubo et al. |
| 2010/0289373 | A1 * | 11/2010 | Nishiyama .................... 310/195 |
| 2012/0055193 | A1 | 3/2012 | Fukasaku |
| 2012/0057999 | A1 | 3/2012 | Fukasaku et al. |

FOREIGN PATENT DOCUMENTS

| CN | 1253246 | 5/2000 |
|---|---|---|
| CN | 1761130 | 4/2006 |
| CN | 1808847 | 7/2006 |
| CN | 101378216 | 3/2009 |

(Continued)

*Primary Examiner* — Burton Mullins
(74) *Attorney, Agent, or Firm* — Greenblum & Bernstein, P.L.C.

(57) ABSTRACT

An electric motor for a motor-driven compressor is provided. The electric motor includes a stator and a rotor. The stator is fixed to a housing. The rotor is arranged outward of the stator. The rotor is mounted on a rotary shaft to rotate integrally with the rotary shaft. The stator includes slots and a stator coil wound about the slots. The rotor includes a rotary support and a magnet. The rotary support is fixed to the rotary shaft to rotate integrally with the rotary shaft. The magnet is supported by the rotary support. The arrangement of the magnetic poles of the magnet in the circumferential direction is a Halbach array.

11 Claims, 10 Drawing Sheets

(56) References Cited

FOREIGN PATENT DOCUMENTS

| | | |
|---|---|---|
| CN | 101527487 | 9/2009 |
| CN | 201985646 | 9/2011 |
| EP | 0999546 | 10/2000 |
| JP | 07-75301 | 3/1995 |
| JP | 3063451 | 11/1999 |
| JP | 2000-50594 | 2/2000 |
| JP | 2000-197287 | 7/2000 |
| JP | 2002-354721 | 12/2002 |
| JP | 2003-47197 | 2/2003 |
| JP | 2005-160153 | 6/2005 |
| JP | 2005-304292 | 10/2005 |
| JP | 2006-180576 | 7/2006 |
| JP | 2006-299809 * | 11/2006 ............. F04B 39/00 |
| JP | 2009-11041 | 1/2009 |
| WO | 2010/026427 | 3/2010 |

* cited by examiner

ELECTRIC MOTOR FOR A MOTOR-DRIVEN COMPRESSOR AND SAID MOTOR-DRIVEN COMPRESSOR

BACKGROUND

This invention relates to an electric motor for a motor-driven compressor. The present invention further pertains to a motor-driven compressor.

Japanese Laid-Open Patent Publication No. 2006-180576 discloses a hermetic compressor including an electric motor section, which is a permanent magnet electric motor, located in a hermetic case, and a rotary compression section, which is rotated by the permanent magnet electric motor via a crankshaft. The permanent magnet electric motor includes a stator on which magnetic pole teeth for coils are formed, and a permanent magnet rotor arranged outward of the stator. The permanent magnet rotor includes a rotor core located on the outer circumference, and a resin bonded permanent magnet mounted on the inner circumferential portion of the rotor core by injection molding. The crankshaft is fixed to the rotor core. Thus, the stator and the rotor of the permanent magnet electric motor are respectively arranged inward and outward of each other. Also, the hermetic compressor is a motor-driven compressor that integrally includes the compression section and the electric motor section.

When the coil of the stator is energized, current flows across a magnetic flux formed by the permanent magnet located on the inner circumference of the rotor core. Then, the permanent magnet rotor and the crankshaft fixed to the permanent magnet rotor are rotated. As the crankshaft rotates, a refrigerant gas drawn in through a suction pipe provided in the hermetic case is compressed in the compression section and discharged to the outside of the hermetic case through a discharge pipe.

Figure 12:
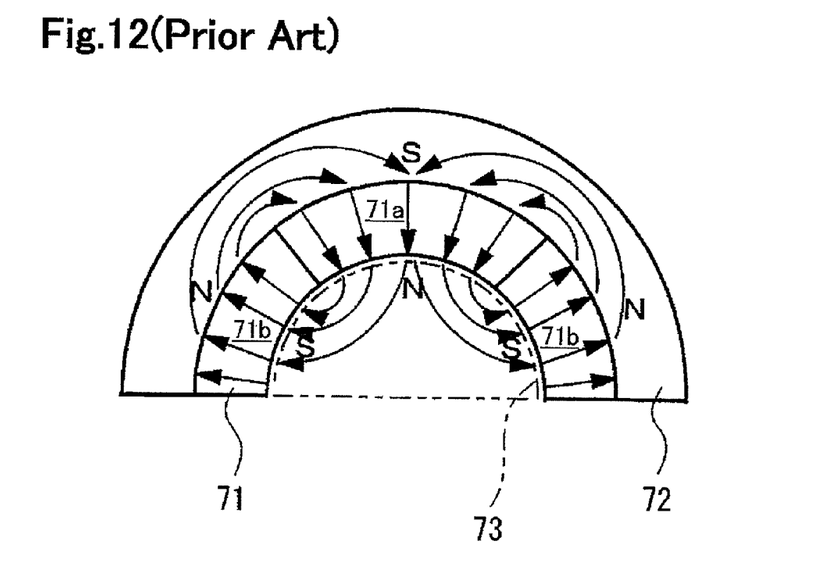
FIG. 12 is an enlarged cross-sectional view of a main section for explaining the flow of magnetic flux in an electric motor according to a general technique.

According to the technique disclosed in Japanese Laid-Open Patent Publication No. 2006-180576, permanent magnets are provided on the inner circumferential portion of the rotor core, and the permanent magnets are arranged such that the north poles and the south poles of the permanent magnets are alternately arranged in the circumferential direction of the rotor. For example, as shown in FIG. 12 of the present application, permanent magnets 71 have a magnet arrangement of a radial orientation. According to this magnet arrangement, first magnets 71a, the inner circumferential surface of each of which is magnetized to the north pole and the outer circumferential surface of each of which is magnetized to the south pole, and second magnets 71b, the inner circumferential surface of each of which is magnetized to the south pole and the outer circumferential surface of each of which is magnetized to the north pole, are arranged alternately in the circumferential direction. In this case, the magnetic flux exerted from each north pole located on the inner circumference passes inside the stator core 73 arranged inward of the permanent magnets 71 with a gap formed in between. The magnetic flux that has passed inside the stator core 73 forms flow of magnetic flux, or magnetic lines of force toward the south poles adjacent to the north pole. In the permanent magnets 71, the flow of magnetic flux from the south poles located on the inner circumference of the second magnets 71b toward the north poles located on the outer circumference, and the flow of magnetic flux from the south poles located on the outer circumference of the first magnets 71a toward the north poles located on the inner circumference are formed. In the rotor core 72, the flow of magnetic flux from the north poles to the south poles is formed. In this manner, a loop of the magnetic flux, or a magnetic circuit, is formed as the magnetic flux passes inside the rotor core 72. Thus, for example, in a case in which the rotor core 72 is not formed of a ferromagnetic body such as an iron material, motor characteristics, for example, the torque characteristics might deteriorate as the magnetic characteristics of the permanent magnet electric motor change.

In the motor-driven compressor, in which the compression section and the electric motor section are integrated, a balancing weight is provided on, for example, the rotary shaft to cope with the load fluctuation in the compression section. However, in the case in which the balancing weight is provided, a space for providing the balancing weight is required. Therefore, the size of the motor-driven compressor is increased, which might reduce ease of mounting the motor-driven compressor to, for example, a vehicle.

To limit the increase in the size of the motor-driven compressor, there have been attempts to obtain the rotational balance of the motor-driven compressor by changing the shape of the rotor core in the electric motor section. However, when the shape of the rotor core 72 is changed, the following deficiency might occur. That is, in a case in which the shape of the rotor core 72 is changed by forming holes in the rotor core 72, magnetic flux flow is not formed in the holes, and the magnetic characteristics of the permanent magnet electric motor undesirably change. Thus, the required torque is not obtained. In a case in which the thickness of the rotor core is partly changed, the magnetic characteristics undesirably change, and the same problem occurs.

Accordingly, it is an objective of the present invention to provide an electric motor for a motor-driven compressor that is capable of adjusting the rotational balance in the electric motor while inhibiting increase in the size of the motor-driven compressor.

SUMMARY

To achieve the foregoing objective and in accordance with one aspect of the present invention, an electric motor for a motor-driven compressor is provided. The electric motor includes a stator fixed to a housing and a rotor arranged outward of the stator. The rotor is mounted on a rotary shaft to rotate integrally with the rotary shaft. The stator includes a plurality of slots and a stator coil wound about the slots. The rotor includes a rotary support fixed to the rotary shaft to rotate integrally with the rotary shaft and a magnet supported by the rotary support. The arrangement of the magnetic poles of the magnet in the circumferential direction is a Halbach array.

In accordance with another aspect, a motor-driven compressor is provided that includes a housing, a compression mechanism accommodated in the housing, a rotary shaft, which transmits power to the compression mechanism, and an electric motor for rotating the rotary shaft. The electric motor includes a stator fixed to the housing and a rotor arranged outward of the stator. The rotor is mounted on the rotary shaft to rotate integrally with the rotary shaft. The stator includes a plurality of slots and a stator coil wound about the slots. The rotor includes a rotary support fixed to the rotary shaft to rotate integrally with the rotary shaft and a magnet supported by the rotary support. The arrangement of the magnetic poles of the magnet in the circumferential direction is a Halbach array.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims.

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

An electric motor 15 for a motor-driven compressor according to a first embodiment of the present disclosure will now be described with reference to FIGS. 1 to 6.

Figure 1:
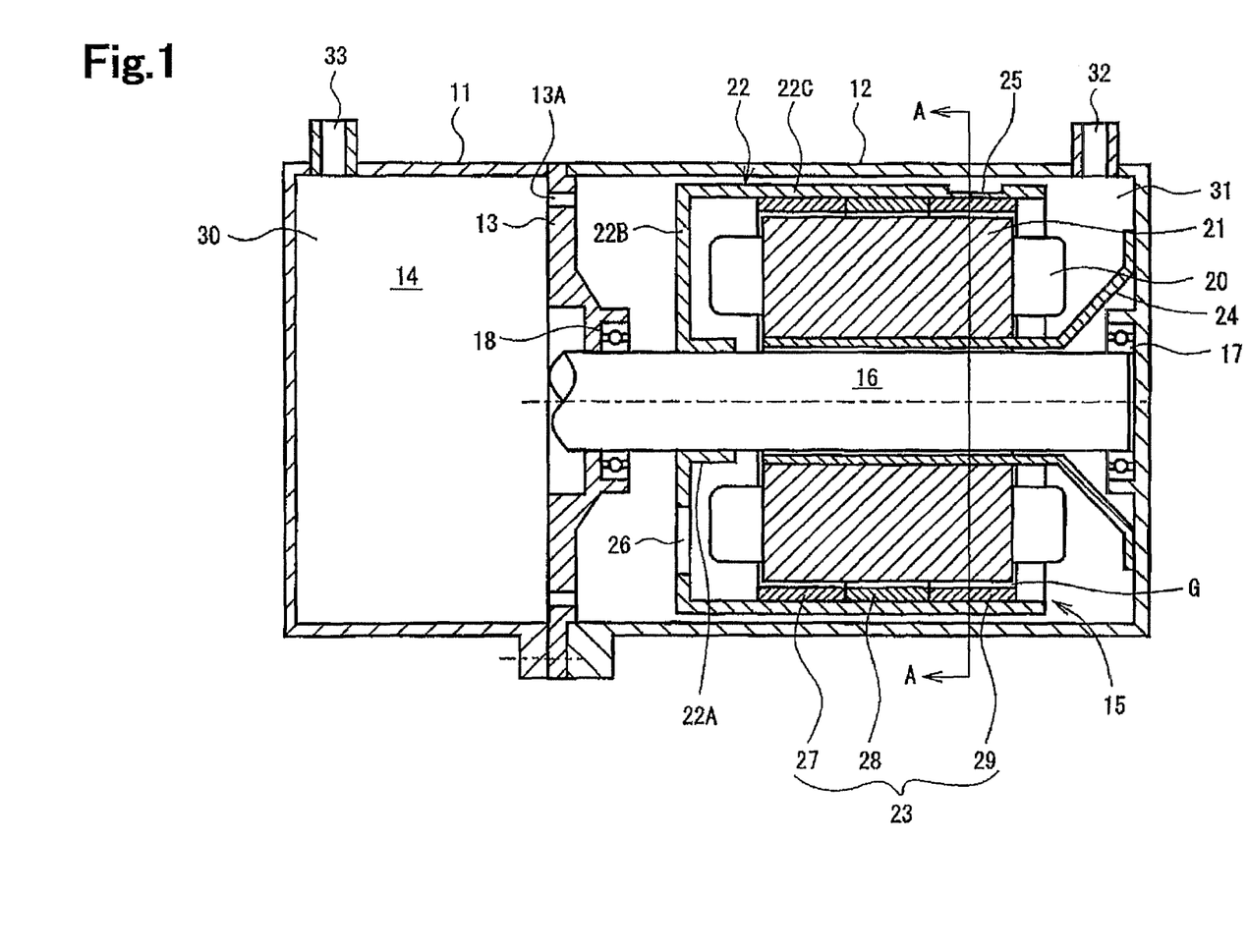
FIG. 1 is a longitudinal cross-sectional view illustrating the entire structure of a motor-driven compressor equipped with an electric motor according to a first embodiment.

FIG. 1 is a longitudinal cross-sectional view illustrating the entire structure of the motor-driven compressor equipped with the electric motor 15. The left side in FIG. 1 is referred to as the front side, and the right side in FIG. 1 is referred to as the rear side.

A housing of the motor-driven compressor shown in FIG. 1 is formed by a front housing 11 and a rear housing 12. The front housing 11 and the rear housing 12 are joined to each other with a partition 13 located in between, and fastened with each other by non-illustrated bolts.

The partition 13 divides a hermetic space in the housing into a front space 30 and a rear space 31. A rotary compression section 14 for compressing a refrigerant is located in the front space 30. The rotary compression section 14 includes, for example, a non-illustrated scroll-type compression mechanism. The electric motor 15 is located in the rear space 31. An inlet 32 for a refrigerant gas is located in the rear housing 12. An outlet 33 for the refrigerant gas compressed by the rotary compression section 14 is located in the front housing 11. An opening 13A, which guides the refrigerant gas introduced into the rear space 31 through the inlet 32 to the front space 30, is formed in the partition 13.

A rotary shaft 16 of the motor-driven compressor is located at the central portion of the rear housing 12. The rotary shaft 16 is supported by a bearing 17 located in the rear housing 12 and a bearing 18 located in the partition 13 to be freely rotational. The rotary shaft 16 is coupled to a non-illustrated compression mechanism in the rotary compression section 14. For example, in the case of the scroll-type compression mechanism, the rotary shaft 16 is coupled to a movable scroll.

Figure 2:
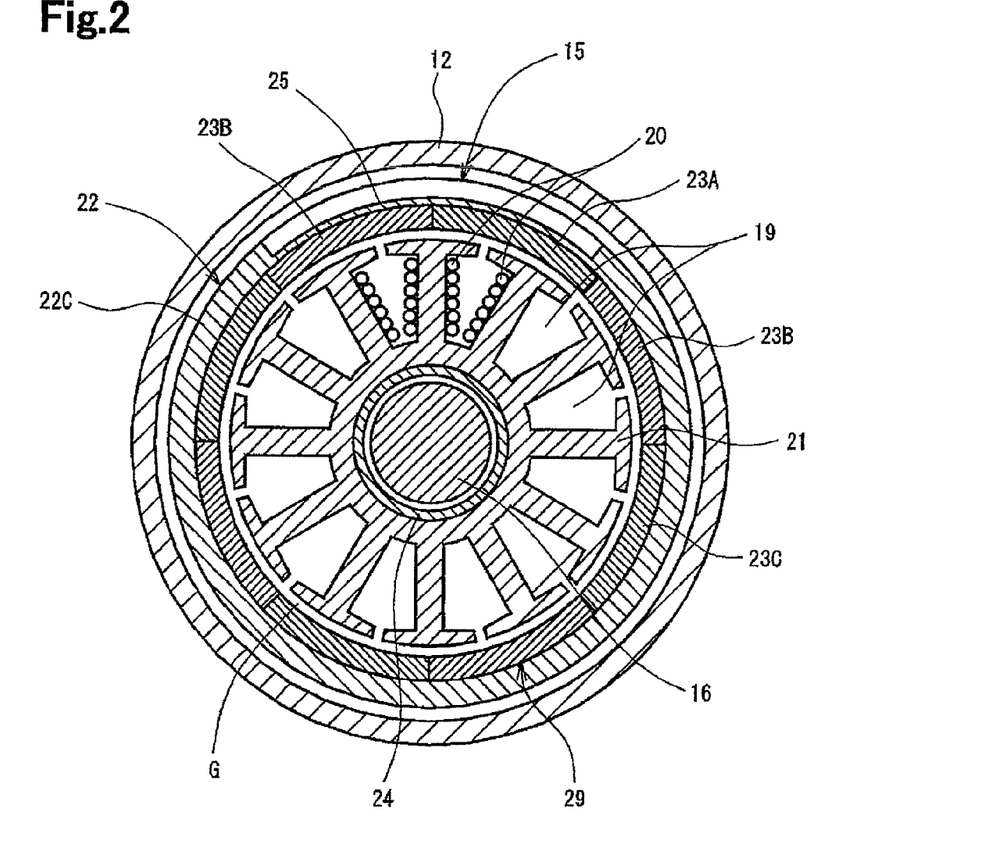
FIG. 2 is a cross-sectional view taken along line A-A of FIG. 1.

As shown in FIGS. 1 and 2, the electric motor 15 includes a stator core 21 and a rotary support 22. Most of the rotary support 22 is arranged outward of the stator core 21, and the rotary support 22 is also mounted on the rotary shaft 16 to rotate integrally with the rotary shaft 16. The stator core 21 corresponds to a stator of the electric motor 15, and the rotary support 22 corresponds to a rotor.

The stator core 21 has a cylindrical shape. Slots 19 are formed on the periphery of the stator core 21 at equal intervals in the circumferential direction. In FIG. 2, the number of the slots 19 is twelve. A stator coil 20 is wound about the slots 19. FIG. 2 shows only the stator coil 20 around some of the slots 19. The stator coil 20 is wound by distributed winding or concentrated winding. Three-phase alternating voltage is applied to the stator coil 20. The stator core 21 is secured to a support member 24 located on the inner periphery so as to be supported by the rear housing 12. That is, the support member 24 includes a tubular section through which the rotary shaft 16 extends, and a section fixed to the rear housing 12. The support member 24 is fixed to the rear housing 12 by non-illustrated bolts. A gap is formed between the support member 24 and the rotary shaft 16.

The rotary support 22 is cup-shaped, that is, one end of the rotary support 22 is open and the other end of the rotary support 22 is closed. That is, the rear end of the rotary support 22 is open, and the front end of the rotary support 22 is closed. The rotary support 22 includes a tubular boss portion 22A, a flange portion 22B, and a cylindrical portion 22C. The boss portion 22A located at the central portion of the rotary support 22 is securely fitted to the rotary shaft 16. The flange portion 22B is located on the front end of the boss portion 22A. The tubular cylindrical portion 22C extends rearward from the periphery of the flange portion 22B. That is, the cylindrical portion 22C of the rotary support 22 is located outward of the stator core 21, and the cylindrical portion 22C is supported by the rotary shaft 16 via the flange portion 22B and the boss portion 22A. The rotary support 22 is formed of aluminum. However, the rotary support 22 may be formed of a non-magnetic metal other than aluminum.

Figure 3:
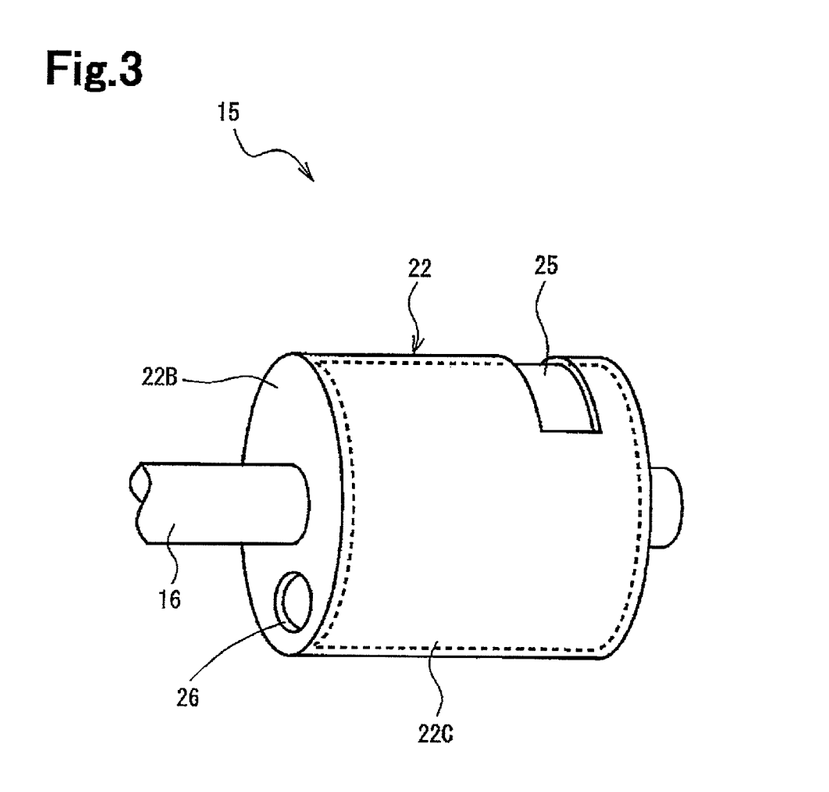
FIG. 3 is a perspective view illustrating the electric motor of FIG. 1.

As shown in FIG. 3, a recess 25 is formed in the cylindrical portion 22C of the rotary support 22. The recess 25 has a predetermined width in the axial direction of the rotary shaft 16. The recess 25 is formed by cutting out a part of the cylindrical portion 22C by a predetermined angle in the circumferential direction of the rotary support 22. A round through hole 26 is formed in the flange portion 22B of the rotary support 22. The recess 25 and the through hole 26, which serve as lightening portions, are machined portions for adjusting the rotational balance of the motor-driven compressor. That is, rotation of the rotary compression section 14 of the motor-driven compressor tends to be unbalanced due to load fluctuation associated with rotation. The recess 25 and the through hole 26 are formed in the electric motor 15 to cancel the rotational unbalance. The recess 25 and the through hole 26 are formed at positions where the recess 25 and the through hole 26 are not in axial symmetry with respect to the axis of the rotary shaft 16.

Figure 4A:
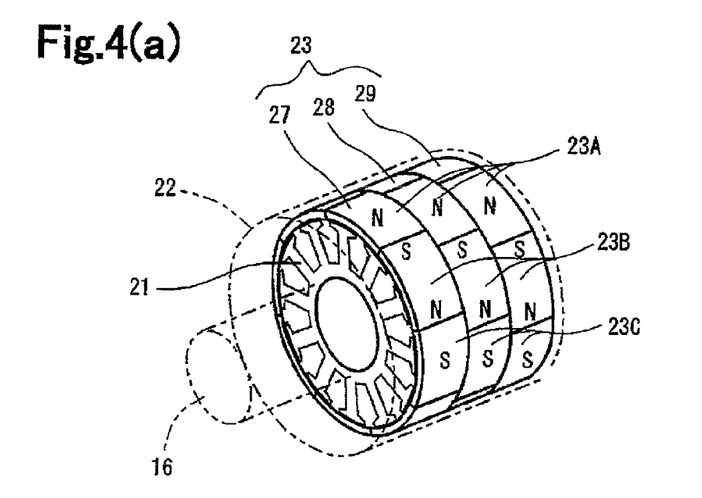
FIG. 4(a) is a perspective view illustrating the arrangement of magnet groups in the electric motor of FIG. 1.

As shown in FIGS. 1 and 4(a), a magnet group assembly 23 is secured to the inner circumferential surface of the cylindrical portion 22C of the rotary support 22. The magnet group assembly 23 is formed of three consecutive rows in the axial direction. An annular magnet group in a first row is referred to as a magnet group 27, an annular magnet group in a second row is referred to as a magnet group 28, and an annular magnet group in a third row is referred to as a magnet group 29. Each of the magnet groups 27, 28, 29 is formed such that arcuate magnet pieces 23A, arcuate magnet pieces 23B, and arcuate magnet pieces 23C are alternately arranged in the circumferential direction.

Figure 5:
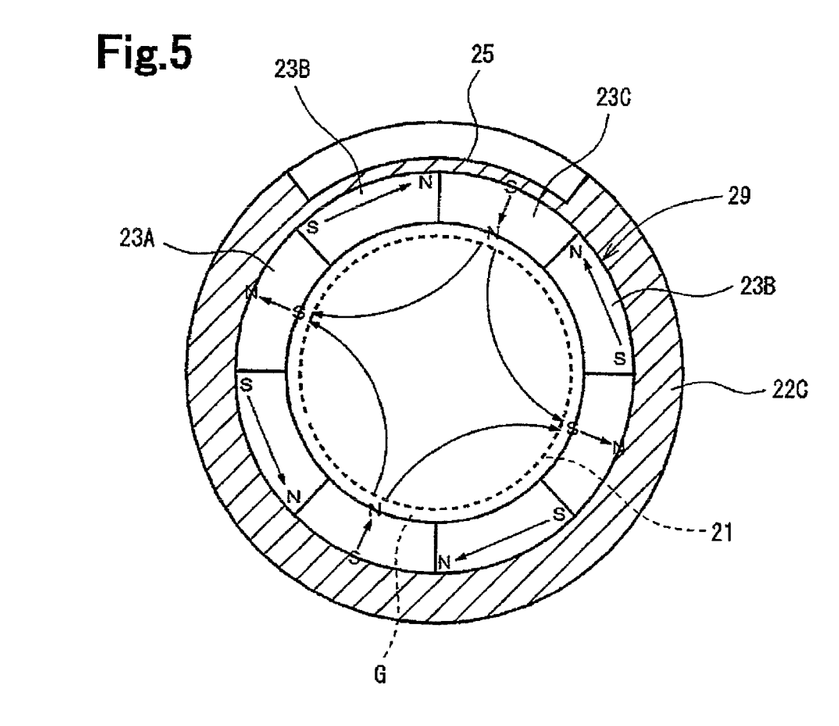
FIG. 5 is an enlarged cross-sectional view of a main section for explaining the direction of magnetization and the flow of magnetic flux in the electric motor of FIG. 1.

First, the magnet group 29 will be described with reference to FIG. 2. The magnet group 29 includes the arcuate magnet pieces 23A, 23B, 23C arranged in a Halbach array. The arcuate magnet pieces 23A, 23B, 23C are arranged in the circumferential direction of the rotary support 22. As shown in FIG. 5, the arcuate magnet pieces 23A are an arcuate magnet piece in the Halbach array that is magnetized such that the center of the inner circumferential surface is a south pole. Each arcuate magnet piece 23B is an arcuate magnet piece in the Halbach array that is magnetized such that the end surfaces in the circumferential direction are a north pole and a south pole. Each arcuate magnet piece 23C is an arcuate magnet piece in the Halbach array that is magnetized such that the center of the inner circumferential surface is a north pole. Each arcuate magnet piece 23A is sandwiched between the arcuate magnet pieces 23B the south poles of which face each other. Each arcuate magnet piece 23C is sandwiched between the arcuate magnet pieces 23B the north poles of which face each other. In the first embodiment, eight arcuate magnet pieces 23A, 23B, 23C form the magnet group 29 in the Halbach array. The magnet groups 27, 28 are also equivalent to the magnet group 29. The magnet having a Halbach array refers to a magnet that is magnetized such that the direction of magnetization in the magnet is gradually changed depending on positions, and the magnetic flux is concentrated at the center of the magnetic poles in the magnet.

Figure 4B:
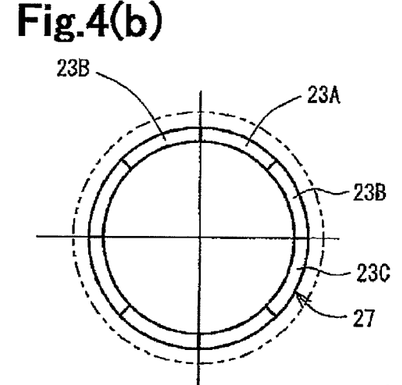
FIG. 4(b) shows the phases of the magnetic poles of the magnet group in the first row in the electric motor of FIG. 1.
Figure 4C:
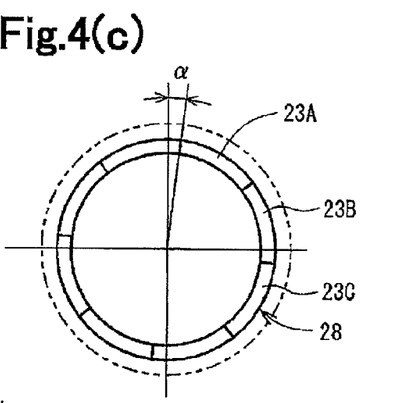
FIG. 4(c) shows the phases of the magnetic poles of the magnet group in the second row in the electric motor of FIG. 1.
Figure 4D:
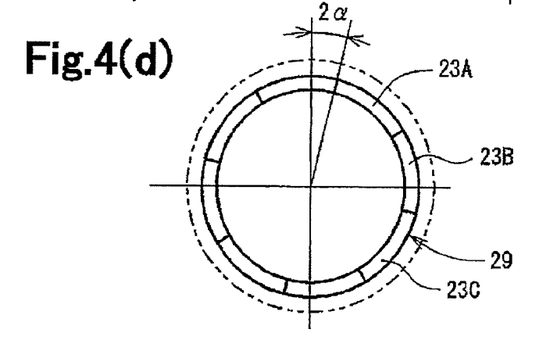
FIG. 4(d) shows the phases of the magnetic poles of the magnet group in the third row in the electric motor of FIG. 1.

As shown in FIGS. 4(b) to 4(d), the magnet groups 27, 28, 29 are arranged in a state where the phase of the magnetic poles in the circumferential direction is sequentially displaced by a predetermined angle α. The symbol α represents a displacement amount, or the angle, of the phase of the magnetic poles. In other words, in a case in which the phase of the magnetic poles of the magnet group 27 in the first row shown in FIG. 4(b) is used as the reference, the phase of the magnetic poles of the magnet group 28 in the second row shown in FIG. 4(c) is displaced clockwise by, for example, the predetermined angle α as viewed from the front side. The phase of the magnetic poles of the magnet group 29 in the third row shown in FIG. 4(d) is displaced clockwise by the predetermined angle 2α. That is, the phase of the magnetic poles of the magnet group 29 in the third row shown in FIG. 4(d) is displaced clockwise by the predetermined angle α with respect to the phase of the magnetic poles of the magnet group 28 in the second row shown in FIG. 4(c). In the first embodiment, α is set to approximately 10°.

As shown in FIGS. 1 and 5, a gap G is formed between the inner circumferential surface of the magnet groups 27, 28, 29 and the outer circumferential surface of the stator core 21.

The operations of the electric motor 15 formed as described above will now be described.

As shown in FIG. 5, the magnetic flux exerted from the north pole located on the inner circumference of the arcuate magnet piece 23C passes through the stator core 21 arranged inward of the magnet group 29 via the gap G. The magnetic flux forms flow of magnetic flux, that is, magnetic lines of force toward the south poles located on the inner circumference of the arcuate magnet pieces 23A. In each of the arcuate magnet pieces 23A, the magnetic flux further heads toward the north pole located on the outer circumference of the arcuate magnet piece 23A from the south pole located on the inner circumference of the arcuate magnet piece 23A. In each of the arcuate magnet pieces 23B, the magnetic flux further heads toward the north pole at the end face of the arcuate magnet piece 23B from the south pole at the end face of the arcuate magnet piece 23B. In each of the arcuate magnet pieces 23C, the magnetic flux further heads toward the north pole located on the inner circumference of the arcuate magnet piece 23C from the south pole located on the outer circumference of the arcuate magnet piece 23C.

In this manner, by using the magnet group 29 arranged in the Halbach array, the magnetic flux exerted from the north pole heads toward the adjacent south poles passing through the stator core 21, and flows directly from the south poles of the arcuate magnet pieces 23A toward the north poles of the arcuate magnet pieces 23C within the arcuate magnet pieces 23A, 23B, 23C. Thus, the magnetic flux forms a magnetic flux loop, that is, a magnetic circuit that hardly passes through the cylindrical portion 22C of the rotary support 22. The stator coil 20 is wound about the slots 19 of the stator core 21 to interlink with the magnetic flux. Since current flows in the stator coil 20 wound as described above, force is applied to the rotary support 22. As a result, the rotary support 22 and the rotary shaft 16 are rotated.

Thus, since the flow of magnetic flux in the electric motor 15 is not affected although the recess 25 is formed in the cylindrical portion 22C, motor characteristics, for example, the torque characteristics of the electric motor 15 do not change. Therefore, the recess 25 may be formed in the cylindrical portion 22C of the rotary support 22 besides the through hole 26 formed in the flange portion 22B of the rotary support 22. Forming the through hole 26 and the recess 25 allows the rotational balance of the motor-driven compressor to be adjusted in the electric motor 15.

Since forming the recess 25 and the through hole 26 in the rotary support 22 allows the rotational balance to be adjusted, it is unnecessary to arrange a balancing weight on, for example, the rotary shaft 16. This inhibits the size of the motor-driven compressor from being increased.

Furthermore, the rotary support 22 may be formed without using a ferromagnetic body such as an iron material. The rotary support 22 may be formed of a non-magnetic metal such as aluminum. In particular, aluminum has strength and small specific gravity among non-magnetic metals. Thus, using aluminum reduces the weight of the electric motor 15, and reduces moment of inertia associated with rotation.

Figure 6:
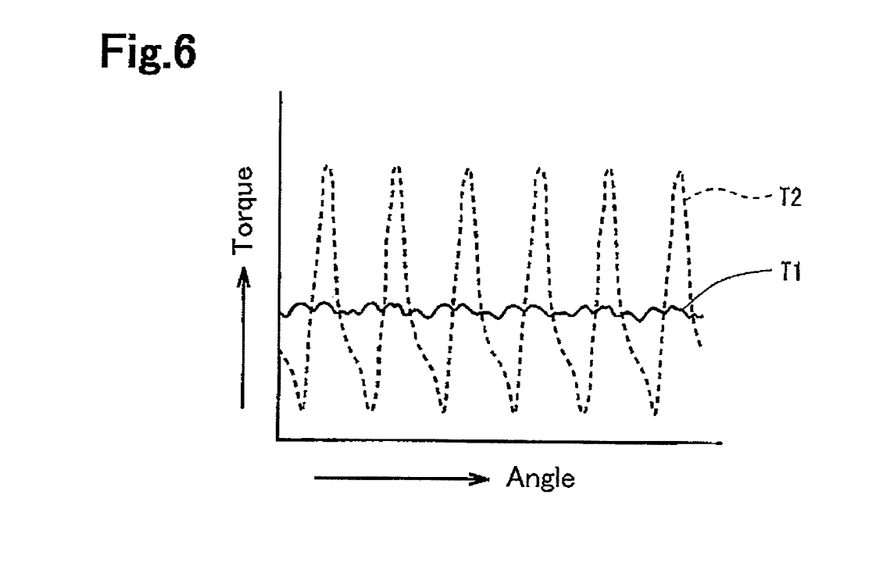
FIG. 6 is a graph showing the torque characteristics of the electric motor of FIG. 1.

FIG. 6 is a graph showing the torque characteristics of the electric motor 15 according to the first embodiment. The horizontal axis represents a rotational angle (°), and the vertical axis represents a torque (arbitrary unit). Solid line T1 shows the torque characteristics of the structure according to the first embodiment, that is, the structure in which the magnet groups 27, 28, 29 are arranged consecutively in three rows in the axial direction, and the phases of the magnetic poles are displaced by the predetermined angle α in the circumferential direction. Broken line T2 as a comparative example shows the torque characteristics of the structure in which the magnet groups 27, 28, 29 are arranged consecutively in three rows in the axial direction, and the phases of the magnetic poles in the circumferential direction are not displaced.

According to broken line T2 as a comparative example, the maximum value of the torque is great, but the torque ripple is also great. Thus, in this comparative example, deterioration of the NV (noise and vibration) characteristics of the electric motor is expected. According to solid line T1, the torque ripple is significantly reduced. The torque ripple is a fluctuation range of the torque when the motor is rotated.

Thus, the NV characteristics of the electric motor 15 are improved by using aluminum for the rotary support 22, consecutively arranging the magnet groups 27, 28, 29 in the Halbach array in three rows in the axial direction, and arranging the magnet groups 27, 28, 29 in a state where the phases of the magnetic poles are displaced by the predetermined angle α in the circumferential direction.

The magnet group assembly 23 is formed by consecutively arranging the three magnet groups 27, 28, 29 in three rows. Thus, a small number of magnets efficiently reduce the torque ripple. The predetermined angle α is determined based on the number of the magnetic poles and the number of the slots. Like the first embodiment, for example, in a case in which the number of the magnetic poles is four and the number of the slots is twelve, setting of α≈10° is suitable. That is, the torque ripple is minimized when the magnet groups 27, 28, 29 arranged consecutively in three rows are arranged such that the phases are displaced by 10°. That is, the magnet group 27 and the magnet group 28 are arranged such that the phases of the magnetic poles of the magnet group 27 and the magnet group 28 are displaced by 10°. Furthermore, the magnet group 28 and the magnet group 29 are arranged such that the phases of the magnetic poles of the magnet group 28 and the magnet group 29 are displaced by 10°. That is, the magnet group 27 and the magnet group 29 are in such a positional relationship that the phases of the magnetic poles of the magnet group 27 and the magnet group 29 are displaced by 20°.

In the case with a 6-pole 18-slot motor, α≈6.7° is suitable. In a state where the magnet groups 27, 28, 29 arranged in three consecutive rows are arranged such that the phases are displaced by 6.7°, the torque ripple is minimized. In the case with a 8-pole 12-slot motor, a 5° is suitable. In a state where the magnet groups 27, 28, 29 arranged in three consecutive rows are arranged such that the phases are displaced by 5°, the torque ripple is minimized.

The electric motor 15 according to the first embodiment has the following advantages.

(1) Since the arrangement of the magnetic poles of the magnet group assembly 23 in the circumferential direction is a Halbach array, the magnetic flux hardly passes inside the rotary support 22. Therefore, even in a case in which the rotational balance of the compressor is adjusted by varying the shape of the rotary support 22, the magnetic characteristics of the electric motor 15 are hardly affected, and the torque characteristics of the electric motor 15 hardly change. Thus, the rotational balance is adjusted in the electric motor 15 while limiting the size of the motor-driven compressor. The rotary support 22 is formed of aluminum, which is a non-magnetic metal. As compared to a case in which the rotary support 22 is formed of a ferromagnetic body, the influence on the magnetic characteristics of the electric motor 15 is dramatically small even if the shape of the rotary support is varied. Therefore, the through hole 26 may be formed in the flange portion 22B of the rotary support 22, and the recess 25 may be formed in the cylindrical portion 22C of the rotary support 22. The rotational balance of the motor-driven compressor is adjusted in the electric motor 15 by forming the through hole 26 and the recess 25.

(2) The rotational balance is adjusted by forming the recess 25 and the through hole 26 in the rotary support 22. It is therefore not necessary to arrange a balancing weight on, for example, the rotary shaft 16, and increase in the size of the motor-driven compressor is inhibited. Although the through hole 26 is formed in the rotary support 22, the magnetic characteristics of the electric motor 15 are not affected. In a case where a bonded magnet, in which a powdery magnetic body is solidified with resin, is employed as a permanent magnet, if the through hole 26 is formed in the cylindrical portion 22c, part of the magnet is not restricted and might deform radially outward by centrifugal force. However, such a problem does not occur when the recess 25 is formed in the cylindrical portion 22c.

(3) The rotary support 22 does not need to be formed of a ferromagnetic body such as an iron material. The rotary support 22 may be formed of a non-magnetic metal such as aluminum. In particular, aluminum has strength and small specific gravity among non-magnetic metals. Thus, using a non-magnetic metal such as aluminum reduces the weight of the electric motor 15, and reduces the moment of inertia associated with rotation.

(4) The torque ripple is significantly reduced by using aluminum for the rotary support 22, consecutively arranging the magnet groups 27, 28, 29 in the Halbach array in three rows in the axial direction, and arranging the magnet groups 27, 28, 29 in a state where the phases of the magnetic poles in the circumferential direction are displaced by the predetermined angle α. Thus, the NV characteristics of the electric motor 15 are improved.

(5) The magnet group assembly 23 is formed by consecutively arranging the three magnet groups 27, 28, 29 in three rows. Thus, a small number of magnets efficiently reduce the torque ripple.

(6) Since the through hole 26 permits the refrigerant to easily pass through the electric motor 15, the cooling performance of the stator core 21 is improved. The refrigerant passes through the gap G between the stator core 21 and the rotary support 22.

Second Embodiment

An electric motor according to a second embodiment will now be described with reference to FIG. 7.

In the second embodiment, the shape of the rotary support 22 according to the first embodiment is modified, and other structures are common.

For illustration purposes, some of the reference numerals used in the foregoing description will be commonly used. The description of the structures common to the first embodiment will be omitted, and only modifications are described.

Figure 7:
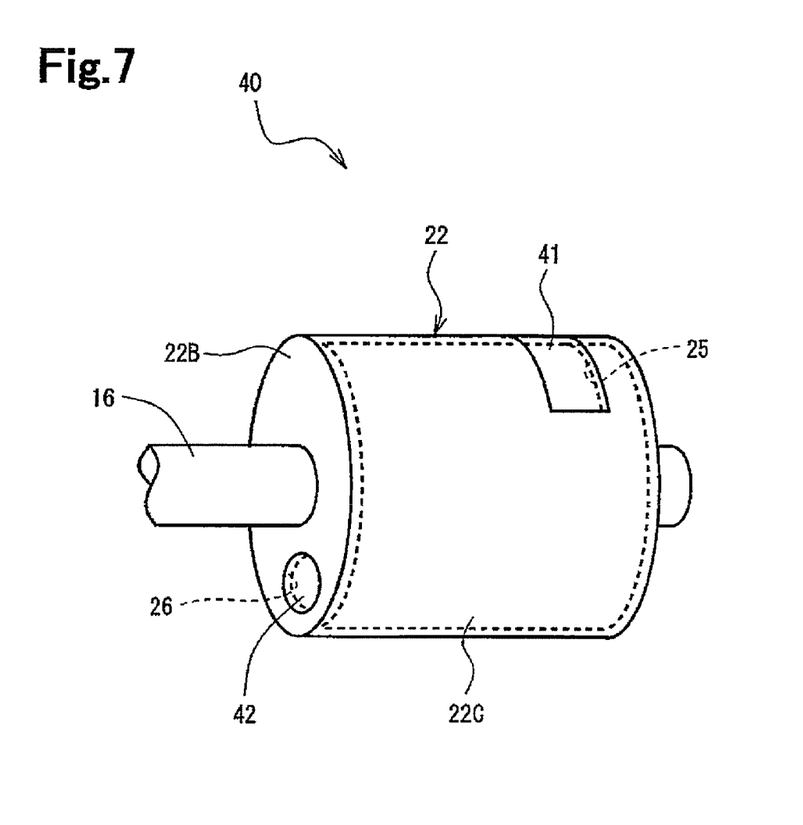
FIG. 7 is a perspective view illustrating an electric motor according to a second embodiment.

As shown in FIG. 7, in an electric motor 40 of the second embodiment, the recess 25 is formed in the cylindrical portion 22C of the rotary support 22, and the through hole 26 is formed in the flange portion 22B of the rotary support 22 like the first embodiment. Brass members are embedded in the recess 25 and the through hole 26. That is, an arcuate first member 41 formed of brass is embedded in the recess 25, and a circular plate-like second member 42 formed of brass is embedded in the through hole 26. The first member 41 and the second member 42 are balancers for adjusting the rotational balance.

Since other structures are equivalent to the first embodiment, the explanations are omitted.

In the second embodiment, the first member 41 and the second member 42 formed of brass are respectively embedded in the recess 25 and the through hole 26. The first member 41 and the second member 42 are formed of a non-magnetic metal different from aluminum, which is the material of the rotary support 22. The rotational balance is further easily improved as compared to a case in which only the recess 25 and/or the through hole 26 is formed. Brass is a copper-zinc alloy, and the specific gravity of brass is great among the non-magnetic metals. Since the rotational balance of the motor-driven compressor is more easily improved, the motor-driven compressor can respond to greater load fluctuation in the rotary compression section 14. Also, the first member 41 and the second member 42 compensate for the decrease in the rigidity of the rotary support 22 caused by providing the recess 25 and the through hole 26.

Other operations and advantages are the same as (1) to (5) in the first embodiment.

Third Embodiment

An electric motor according to a third embodiment will now be described with reference to FIGS. 8 to 10.

In the third embodiment, through holes are formed in the flange portion 22B of the rotary support 22 of the first embodiment, and other structures are common.

For illustration purposes, some of the reference numerals used in the foregoing description will be commonly used. The description of the structure common to the first embodiment will be omitted, and only modifications are described.

Figure 8:
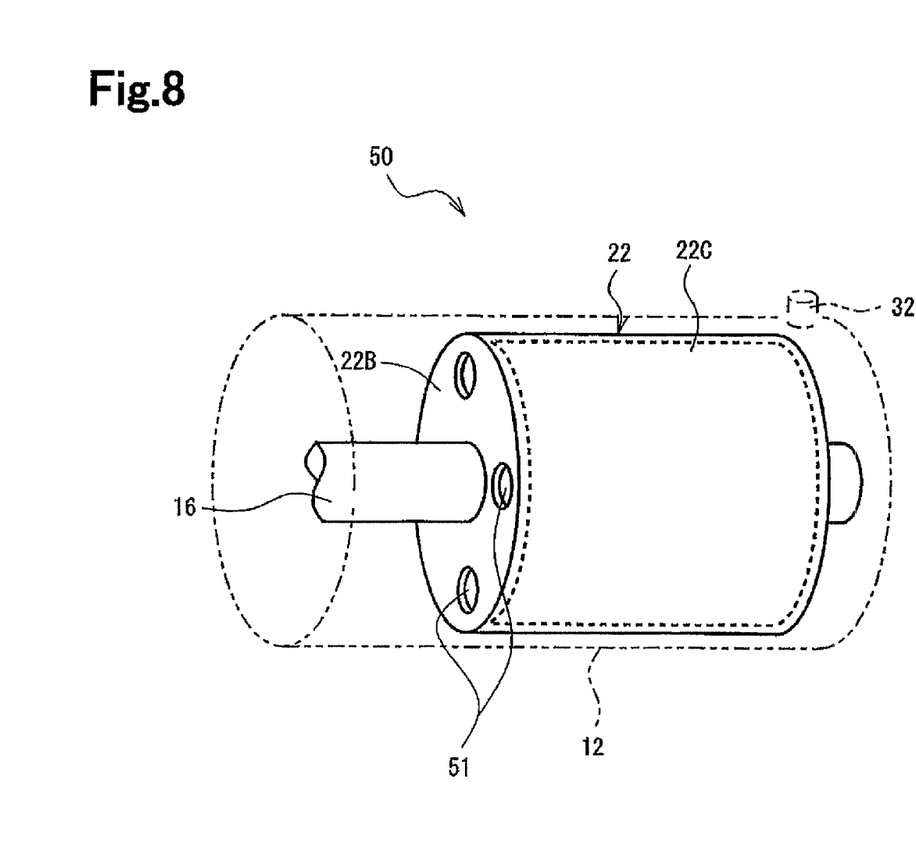
FIG. 8 is a perspective view illustrating an electric motor according to a third embodiment.
Figure 9:
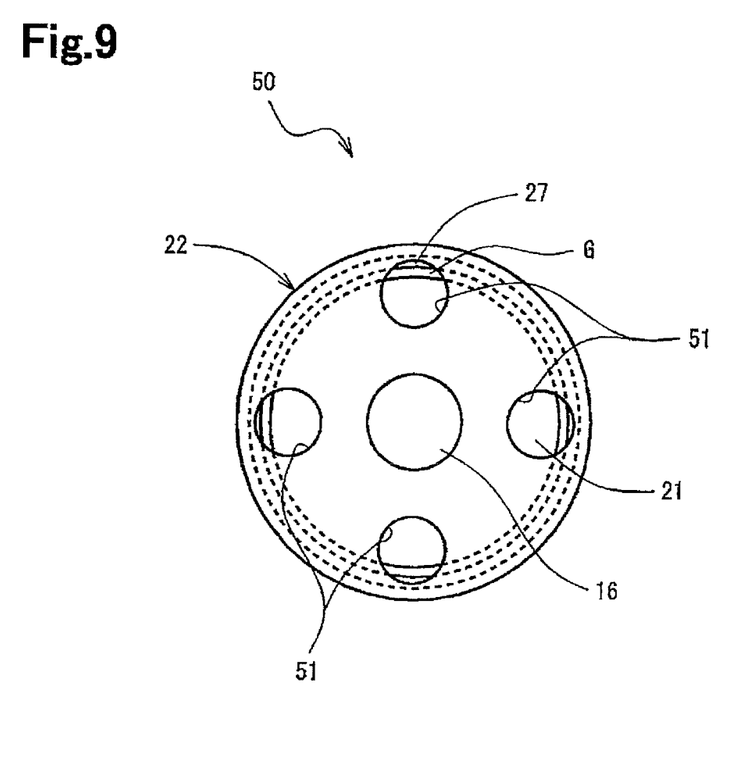
FIG. 9 is a left side view of the electric motor of FIG. 8.
Figure 10:
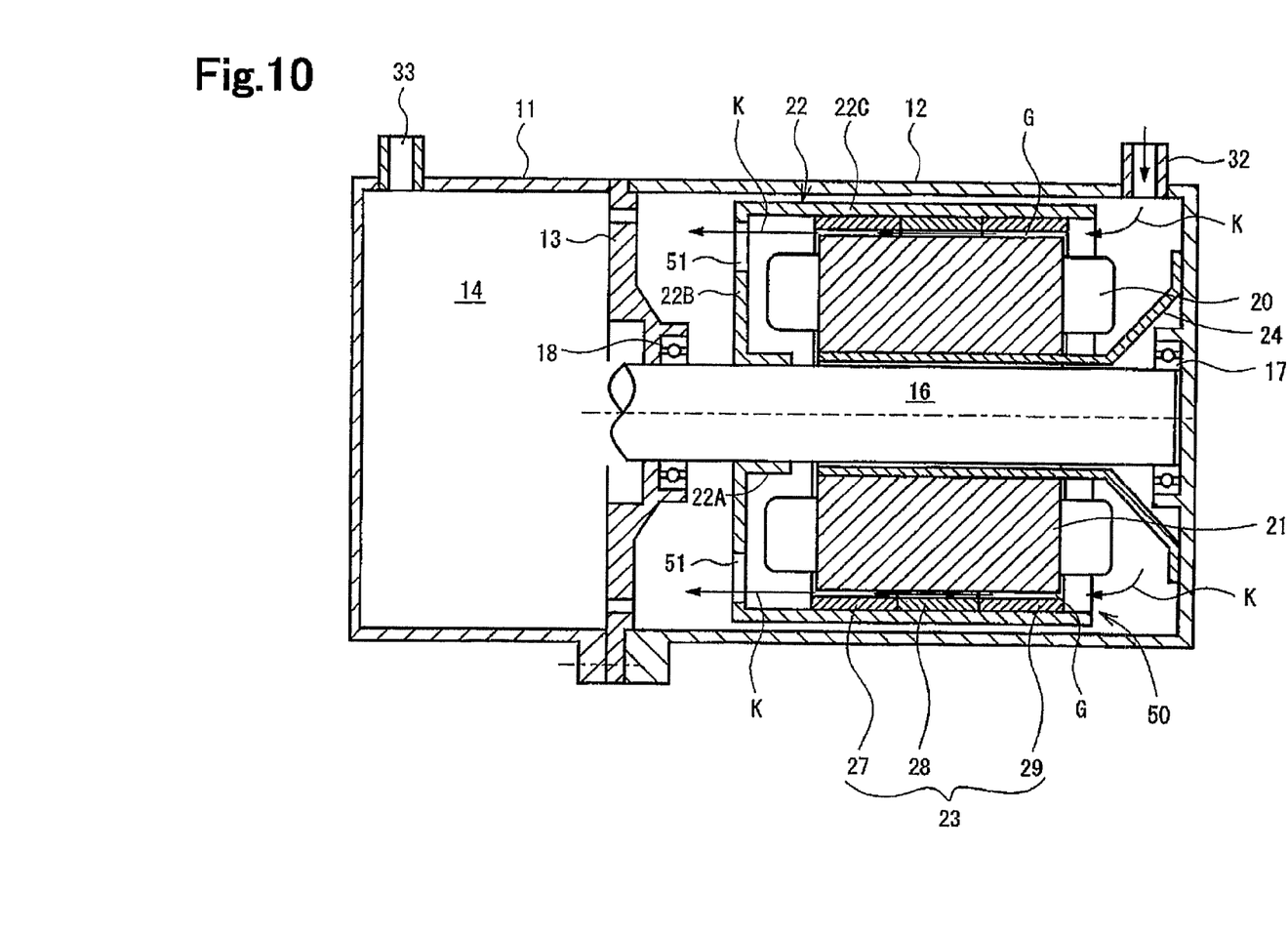
FIG. 10 is a longitudinal cross-sectional schematic view for explaining operations of the electric motor of FIG. 8.

As shown in FIGS. 8 and 9, through holes 51 are formed in the flange portion 22B of the rotary support 22 in an electric motor 50 of the third embodiment. Four through holes 51 are formed at equal intervals, that is, intervals of 90 degrees in the circumferential direction. In FIG. 9, the radial position and the size of the through holes 51 are determined such that part of the gap G can be seen through each of the through holes 51.

Since other structures are equivalent to the first embodiment, the explanations are omitted.

The operations of the electric motor 50 formed as described above will be described using FIG. 10.

The gap G is formed between the inner circumferential surface of the magnet groups 27, 28, 29 of the electric motor 50 and the outer circumferential surface of the stator core 21. The refrigerant gas drawn in through the inlet 32 proceeds through the gap G as shown by arrows K in FIG. 10. The refrigerant gas is then discharged to the rotary compression section 14 via the through holes 51.

In this manner, the refrigerant gas more easily passes through the gap G by forming the through holes 51, and the stator core 21 is cooled. Thus, an increase in the temperature of the stator core 21 is inhibited without changing the torque characteristics of the electric motor 50.

Other operations and advantages are the same as (3) to (5) of the first embodiment.

The present disclosure is not restricted to the illustrated embodiments, but may be modified within the scope of the present invention. For example, the invention may be embodied in the following modifications.

In the first to third embodiments, the rotary support 22 is formed of aluminum. However, a non-magnetic metal other than aluminum may be used.

Figure 11:
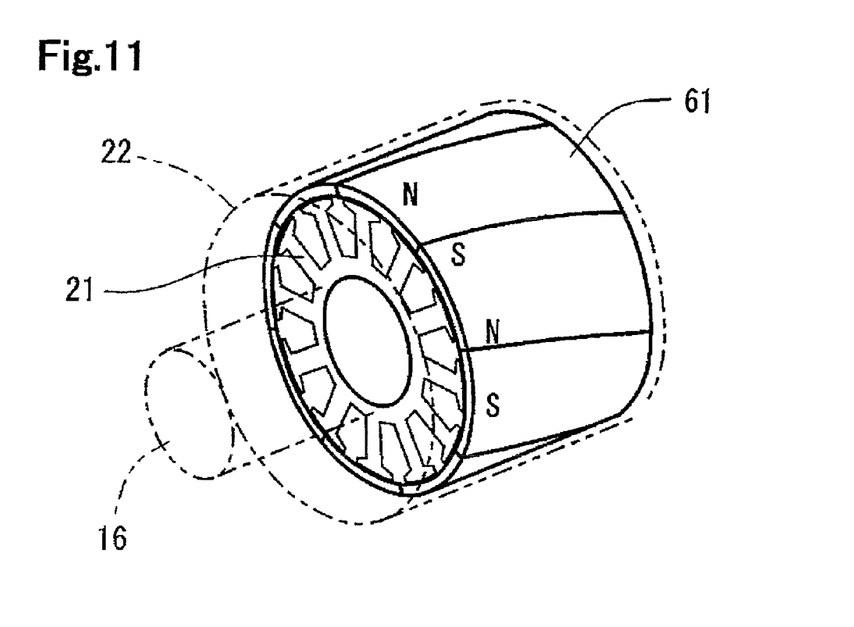
FIG. 11 is a perspective view illustrating the structure of the magnet in an electric motor according to another embodiment.

In the first to third embodiments, the magnet groups 27, 28, 29 in the Halbach array are arranged consecutively in three rows in the axial direction, and are arranged in a state where the phases of the magnetic poles are displaced by the predetermined angle α in the circumferential direction. However, as shown in FIG. 11, a single cylindrical magnet 61 may be used that is formed such that the arrangement of the magnetic poles in the circumferential direction is the Halbach array. The cylindrical magnet 61 is magnetized such that the phase of the magnetic pole is spirally displaced with respect to the axial direction of the rotary shaft 16. In this case, it is unnecessary to consecutively arrange several magnet groups in the axial direction, and it is easy to assemble.

In the first to third embodiments, the magnet groups 27, 28, 29 are formed by arranging the arcuate magnet pieces 23A, 23B, 23C in the Halbach array alternately in the circumferential direction. However, the magnet groups 27, 28, 29 may be formed by a single cylindrical magnet in the Halbach array. For example, the cylindrical magnet may be a bonded magnet formed by solidifying a powdery magnetic body with resin. Since the rigidity of the bonded magnet is low, if a through hole is formed in the cylindrical portion 22C, it is necessary to form the magnet such that part of the magnet that contacts the cylindrical portion 22C is not deformed radially outward by centrifugal force because the part of the magnet is not restricted. However, such a problem does not occur with the recess.

In the first and second embodiments, one recess 25 is formed in the cylindrical portion 22C of the rotary support 22, and one through hole 26 is formed in the flange portion 22B of the rotary support 22. However, two or more recesses or two or more through holes may be formed. Only either the recesses or the through holes may be formed. The recess 25 and the through hole 26 may have any shapes.

In the first to second embodiments, the recess 25 is formed in the cylindrical portion 22C of the rotary support 22. However, a through hole may be formed in the cylindrical portion 22C instead of the recess 25.

In the second embodiment, the first member 41 and the second member 42 formed of brass are respectively embedded in the recess 25 and the through hole 26. However, the first member 41 and the second member 42 may be formed of any non-magnetic metal other than brass.

What is claimed is:

1. An electric motor for a motor-driven compressor, the electric motor comprising:
   a stator fixed to a housing; and
   a rotor arranged outward of the stator, the rotor being mounted on a rotary shaft to rotate integrally with the rotary shaft, wherein
   the stator includes a plurality of slots and a stator coil wound about the slots, and
   the rotor includes:
      a rotary support formed of a non-magnetic metal and fixed to the rotary shaft to rotate integrally with the rotary shaft; and
      a magnet arranged in a circumferential direction of the rotary support and supported by the rotary support, wherein
   the rotary support includes:
      a cylindrical portion, which supports the magnet;
      a flange portion, which closes an opening of the cylindrical portion; and
      a boss portion provided at a central portion of the flange portion and fixed to the rotary shaft,
   wherein one of a recess or a through hole is defined in the cylindrical portion of the rotary support,
   wherein an arrangement of magnetic poles of the magnet arranged in the circumferential direction of the rotary support is a Halbach array, and
   wherein a non-magnetic metal different from the material of the rotary support is embedded in the one of the recess or the through hole.

2. The electric motor for the motor-driven compressor according to claim 1, wherein the non-magnetic metal of the rotary support is aluminum.

3. The electric motor for the motor-driven compressor according to claim 1, wherein the non-magnetic metal embedded in the one of the recess or the through hole is brass.

4. The electric motor for the motor-driven compressor according to claim 1, wherein
the magnet is one of a plurality of magnets arranged consecutively in a plurality of rows in an axial direction of the rotary shaft, and
the magnets are arranged in a state in which phases of the magnetic poles of the magnets are respectively displaced by a predetermined angle in the circumferential direction of the rotary support.

5. The electric motor for the motor-driven compressor according to claim 4, wherein the magnets are arranged consecutively in one of two or three rows in the axial direction of the rotary shaft.

6. The electric motor for the motor-driven compressor according to claim 1, wherein
the magnet is a single cylindrical magnet, and the cylindrical magnet is magnetized such that a phase of the magnetic poles is spirally displaced with respect to an axial direction of the rotary shaft.

7. The electric motor for the motor-driven compressor according to claim 1, wherein the one of the recess or the through hole is a recess is provided in the cylindrical portion to control rotational balance of the motor-driven compressor, the recess being a cutout part of the cylindrical portion defined by a predetermined angle in the circumferential direction of the rotary support and a predetermined width in an axial direction of the rotary shaft.

8. A motor-driven compressor comprising:
a housing;
a compression mechanism accommodated in the housing;
a rotary shaft, which transmits power to the compression mechanism; and
an electric motor for rotating the rotary shaft, wherein
the electric motor includes:
a stator fixed to the housing; and
a rotor arranged outward of the stator, the rotor being mounted on the rotary shaft to rotate integrally with the rotary shaft, wherein
the stator includes a plurality of slots and a stator coil wound about the slots, and
the rotor includes:
a rotary support formed of a non-magnetic metal and fixed to the rotary shaft to rotate integrally with the rotary shaft; and
a magnet arranged in a circumferential direction of the rotary support and supported by the rotary support, wherein
the rotary support includes:
a cylindrical portion, which supports the magnet;
a flange portion, which closes opening of the cylindrical portion; and
a boss portion provided at a central portion of the flange portion and fixed to the rotary shaft,
wherein one of a recess or a through hole is defined in the cylindrical portion of the rotary support,
wherein an arrangement of magnetic poles of the magnet arranged in the circumferential direction of the rotary support is a Halbach array, and
wherein a non-magnetic metal different from the material of the rotary support is embedded in the one of the recess or the through hole.

9. The motor-driven compressor according to claim 8, wherein the one of the recess or the through hole is a recess provided in the cylindrical portion to control rotational balance of the motor-driven compressor, the recess being a cutout part of the cylindrical portion defined by a predetermined angle in the circumferential direction of the rotary support and a predetermined width in an axial direction of the rotary shaft.

10. An electric motor for a motor-driven compressor, the electric motor comprising:
a stator fixed to a housing; and
a rotor arranged outward of the stator, the rotor being mounted on a rotary shaft to rotate integrally with the rotary shaft, wherein
the stator includes a plurality of slots and a stator coil wound about the slots, and
the rotor includes:
a rotary support formed of a non-magnetic metal and fixed to the rotary shaft to rotate integrally with the rotary shaft; and
a magnet arranged in a circumferential direction of the rotary support and supported by the rotary support, wherein
the rotary support includes:
a cylindrical portion, which supports the magnet;
a flange portion, which closes an opening of the cylindrical portion; and
a boss portion provided at a central portion of the flange portion and fixed to the rotary shaft,
wherein one of a recess or a through hole is defined in the cylindrical portion of the rotary support,
wherein an arrangement of magnetic poles of the magnet arranged in the circumferential direction of the rotary support is a Halbach array, wherein a non-magnetic metal different from the material of the rotary support is embedded in the one of the recess or the through hole, and
wherein the non-magnetic metal embedded in the one of the recess or the through hole is brass.

11. The electric motor for the motor-driven compressor according to claim 10, wherein the one of the recess or the through hole is a recess provided in the cylindrical portion to control rotational balance of the motor-driven compressor, the recess being a cutout part of the cylindrical portion defined by a predetermined angle in the circumferential direction of the rotary support and a predetermined width in an axial direction of the rotary shaft.

* * * * *